(12) United States Patent
Katoh

(10) Patent No.: US 10,991,044 B2
(45) Date of Patent: Apr. 27, 2021

(54) STOCK PRICE FORECAST ASSIST SYSTEM AND METHOD

(71) Applicant: Hironobu Katoh, Tokyo (JP)

(72) Inventor: Hironobu Katoh, Tokyo (JP)

( * ) Notice: Subject to any disclaimer, the term of this patent is extended or adjusted under 35 U.S.C. 154(b) by 0 days.

(21) Appl. No.: 16/619,004

(22) PCT Filed: Mar. 30, 2018

(86) PCT No.: PCT/JP2018/013550
§ 371 (c)(1),
(2) Date: Dec. 3, 2019

(87) PCT Pub. No.: WO2019/186988
PCT Pub. Date: Oct. 3, 2019

(65) Prior Publication Data
US 2020/0090273 A1 Mar. 19, 2020

(51) Int. Cl.
*G06Q 40/04* (2012.01)
*G06Q 40/06* (2012.01)
(Continued)

(52) U.S. Cl.
CPC ............ *G06Q 40/04* (2013.01); *G06Q 10/04* (2013.01); *G06Q 10/0637* (2013.01); *G06Q 30/0202* (2013.01); *G06Q 40/06* (2013.01)

(58) Field of Classification Search
CPC .................................................... G06Q 40/00
(Continued)

(56) References Cited

U.S. PATENT DOCUMENTS

| 5,297,032 A | * | 3/1994 | Trojan | ................... | G06Q 40/04 340/4.5 |
| 5,761,442 A | * | 6/1998 | Barr | ..................... | G06N 3/0454 705/36 R |

(Continued)

FOREIGN PATENT DOCUMENTS

| JP | 2005284829 A | 10/2005 |
| JP | 2007257436 A | 10/2007 |

(Continued)

OTHER PUBLICATIONS

International Search Report and Written Opinion (with English translation) issued in PCT/JP2018/013550, dated Jun. 19, 2018.
(Continued)

*Primary Examiner* — Kirsten S Apple
(74) *Attorney, Agent, or Firm* — Hamre, Schumann, Mueller & Larson, P.C.

(57) ABSTRACT

The technology allows to assist the stock price forecast by referring to the past business performance and stock price based on the business performance forecast of the company by the user himself/herself. The system includes a server having a processor, a client configured to transmit a user's forecast value of the company's performance to the server, and a database configured to store the company's current and past performances and stock prices, which are retrievable by the server, wherein the server is configured to retrieve from the database a past performance of the company within a predetermined range from the user's forecast value received from the client, and a stock price at the time, calculate a multiple using the retrieved past performance and the stock price, calculate a theoretical stock price using the user's forecast value and the multiple, and transmit an alert to the client if the current stock price retrieved from the
(Continued)

database deviates from the theoretical stock price by a predetermined value or more.

20 Claims, 4 Drawing Sheets

(51) Int. Cl.
 *G06Q 10/04* (2012.01)
 *G06Q 10/06* (2012.01)
 *G06Q 30/02* (2012.01)
(58) Field of Classification Search
 USPC .......................................................... 705/35
 See application file for complete search history.

(56) References Cited

U.S. PATENT DOCUMENTS

| | | | | |
|---|---|---|---|---|
| 5,812,988 | A * | 9/1998 | Sandretto | G06Q 40/00 702/179 |
| 6,014,645 | A * | 1/2000 | Cunningham | G06Q 20/363 235/379 |
| 6,049,772 | A * | 4/2000 | Payne | G06Q 40/08 705/4 |
| 6,058,379 | A * | 5/2000 | Odom | G06Q 20/10 705/37 |
| 6,313,833 | B1 * | 11/2001 | Knight | G06F 3/04847 705/35 |
| 6,345,090 | B1 * | 2/2002 | Walker | G06Q 10/02 379/114.03 |
| 6,709,330 | B1 * | 3/2004 | Klein | A63F 13/005 463/9 |
| 6,735,580 | B1 * | 5/2004 | Li | G06N 3/049 706/21 |
| 6,954,758 | B1 * | 10/2005 | O'Flaherty | G06Q 30/02 707/802 |
| 7,162,444 | B1 * | 1/2007 | Machado, Jr. | G06Q 30/018 705/317 |
| 7,165,037 | B2 * | 1/2007 | Lazarus | G06Q 30/02 705/7.31 |
| 7,376,431 | B2 * | 5/2008 | Niedermeyer | G06Q 20/403 455/456.3 |
| 7,769,661 | B1 * | 8/2010 | Joss | G06Q 30/04 273/256 |
| 8,104,678 | B2 * | 1/2012 | Yoshikawa | G06Q 20/40 235/380 |
| RE43,435 | E * | 5/2012 | Krause | G06Q 40/00 |
| 8,234,201 | B1 * | 7/2012 | Canabarro | G06Q 40/06 705/36 R |
| 8,412,605 | B2 * | 4/2013 | Griffin | G06Q 40/00 340/5.81 |
| 2002/0161677 | A1 * | 10/2002 | Zumbach | G06Q 40/00 705/35 |
| 2002/0165810 | A1 * | 11/2002 | Evertsz | G06Q 40/00 705/36 R |
| 2002/0184134 | A1 * | 12/2002 | Olsen | G06Q 40/00 705/37 |
| 2003/0069821 | A1 * | 4/2003 | Williams | G06Q 40/06 705/36 R |
| 2003/0149648 | A1 * | 8/2003 | Olsen | G06Q 40/00 705/35 |
| 2004/0093294 | A1 * | 5/2004 | Trevino | G06Q 30/02 705/36 R |
| 2004/0243492 | A1 * | 12/2004 | Korisch | G06Q 40/00 705/35 |
| 2005/0049952 | A1 * | 3/2005 | Carter | G06Q 40/04 705/36 R |
| 2005/0125318 | A1 * | 6/2005 | Jameson | G06Q 40/06 705/30 |
| 2005/0187854 | A1 * | 8/2005 | Cutler | G06Q 40/00 705/37 |
| 2005/0192899 | A1 * | 9/2005 | Reardon | G06Q 20/10 705/40 |
| 2006/0041463 | A1 * | 2/2006 | Yoshida | G06Q 10/06 705/7.31 |
| 2007/0168240 | A1 * | 7/2007 | Alfandary | G06Q 10/087 717/102 |
| 2007/0168269 | A1 * | 7/2007 | Chuo | G06Q 40/06 705/36 R |
| 2007/0244795 | A1 * | 10/2007 | Lutnick | G06Q 40/00 705/37 |
| 2008/0301019 | A1 * | 12/2008 | Monk | G06Q 20/10 705/35 |
| 2010/0023460 | A1 * | 1/2010 | Hughes | G06Q 40/06 705/36 R |
| 2010/0312701 | A1 * | 12/2010 | Bosch | G06Q 20/1085 705/43 |
| 2011/0145149 | A1 * | 6/2011 | Valdes | G06Q 20/10 705/44 |
| 2011/0178912 | A1 * | 7/2011 | Parsons | G06Q 40/06 705/35 |
| 2011/0264581 | A1 * | 10/2011 | Clyne | G06Q 20/10 705/39 |
| 2011/0282804 | A1 * | 11/2011 | Shutt | G06Q 10/04 705/36 R |
| 2012/0029956 | A1 * | 2/2012 | Ghosh | G06Q 10/063 705/7.11 |
| 2012/0078814 | A1 * | 3/2012 | Clark | G06Q 40/04 705/36 R |
| 2012/0278254 | A1 * | 11/2012 | Rosenthal | G06Q 40/06 705/36 R |
| 2012/0323764 | A1 * | 12/2012 | Boberski | G06Q 40/00 705/39 |
| 2013/0031023 | A1 * | 1/2013 | Satchkov | G06Q 40/06 705/36 R |
| 2013/0138577 | A1 * | 5/2013 | Sisk | G06Q 30/02 705/36 R |
| 2013/0226764 | A1 * | 8/2013 | Battyani | G06Q 40/04 705/37 |
| 2014/0156491 | A1 * | 6/2014 | Koh | G06Q 40/04 705/37 |
| 2014/0229353 | A1 * | 8/2014 | Lutnick | G06Q 40/04 705/37 |
| 2015/0221039 | A1 * | 8/2015 | Johansson | G06Q 40/06 705/36 R |

FOREIGN PATENT DOCUMENTS

| | | |
|---|---|---|
| JP | 2012118612 A | 6/2012 |
| JP | 6288662 B1 | 2/2018 |

OTHER PUBLICATIONS

EVseriesVer.3.6, Credit Pricing Corporation, Jun. 2012, pp. 1-9,<URL:http://www.credit-pricing.com/products/pdf/EV36_121026.pdf> With English translation.

Joints of "Correct" Multiple Price Valuation,Credit Pricing Corporation, Mar. 24, 2006, pp. 1-4,<URL:http://credit-pricing.info/data/pdf/EVMM_No.8_060324.pdf> With English translation.

* cited by examiner

STOCK PRICE FORECAST ASSIST SYSTEM AND METHOD

TECHNICAL FIELD

The present technology relates to a system and a method for assisting in forecasting of a company's stock price.

BACKGROUND ART

Methods for recommending buying and selling stocks (issue) of a company is mainly considered to be as follows.

(1) To Determine Based on Stocks' Market Prices.

For example, a sell recommendation is made when an absolute stock price is too high, and a buy recommendation is made when the absolute stock price is too low. In addition, a sell recommendation is made when an increase in a stock price during a certain period is too large, and a buy recommendation is made when a decrease in the stock price is too large.

(2) To Determine Based on Market Capitalization.

For example, a buy recommendation is made when a market capitalization is lower than those of similar companies. In addition, a buy recommendation is made for small market capitalization stocks with large upside in absolute value. For a large cap stock having a large absolute market capitalization, a sell recommendation is made when there is little room for increase.

(3) To Determine Based on Forecasts Made by Analysts of Securities Companies or Research Companies.

Whether a stock price is high or low is determined based on business performance forecasts of analysts. For example, a buy recommendation is made according to an analyst in charge of an electrical appliances sector when a stock price or market capitalization of company A is low with respect to the business performance of company A.

Surprises are forecasted based on a business performance forecast of a specific analyst. For example, a specific analyst B forecasts that business performance of company A exceeds consensus of an unspecified number of analysts collected by Nikkei QUICK Inc., Bloomberg, securities companies, research companies, and the like, and makes a buy recommendation.

(4) Basket Recommendation

An unspecified number of issues that are included in a specific theme or sector are recommended. For example, since artificial intelligence (AI) will be developed in the future, it is recommended to purchase stocks of 30 AI-related companies.

In addition, an unspecified number of issues are recommended, which are extracted based on certain indices or factors, such as a dividend payout ratio and a return on equity (ROE). For example, it is recommended to purchase issues having high dividend yields. However, determination is made based on forecasts of securities companies and research companies, or each listed company's plans or actual performance.

PRIOR ART DOCUMENTS

Patent Documents

[Patent Document 1] Japanese Patent No. 6288662

SUMMARY OF INVENTION

Technical Problem

A system or method is desired, which assists stock price forecasting based on the user's own company performance forecasts, referring to past performances and stock prices.

It is also desirable to have a system or method, which assists stock price forecasting by comparing the user's own company performance forecasts with the performances of the company in the past, and by comparing present stock prices, valuations, etc. with the ones in the past.

Further, a system or method is desired that can be used by only one user without comparison to other users' forecasts.

Further, a system or method is desired that can analyze scenarios based on the range (breadth) of a single user's forecast.

Further, a system or method that can calculate the probability of a forecast based on historical data of a company is desired.

Further, a system or method is desired that makes appropriate stock trading recommendations depending on the user's forecast period (long or short) and investment period (long or short).

Solution to Problem

The technology comprises, for example, a system to assist stock price forecasting comprising: a server having a processor, a client configured to transmit a user's forecast value of the company's performance to the server, and a database configured to store the company's current and past performances and stock prices, which are retrievable by the server, wherein the server is configured to retrieve from the database a past performance of the company within a predetermined range from the user's forecast value received from the client, and a stock price at the time, calculate a multiple using the retrieved past performance and the stock price, calculate a theoretical stock price using the user's forecast value and the multiple, and transmit an alert to the client if the current stock price retrieved from the database deviates from the theoretical stock price by a predetermined value or more.

DESCRIPTION OF EMBODIMENTS

Figure 1:
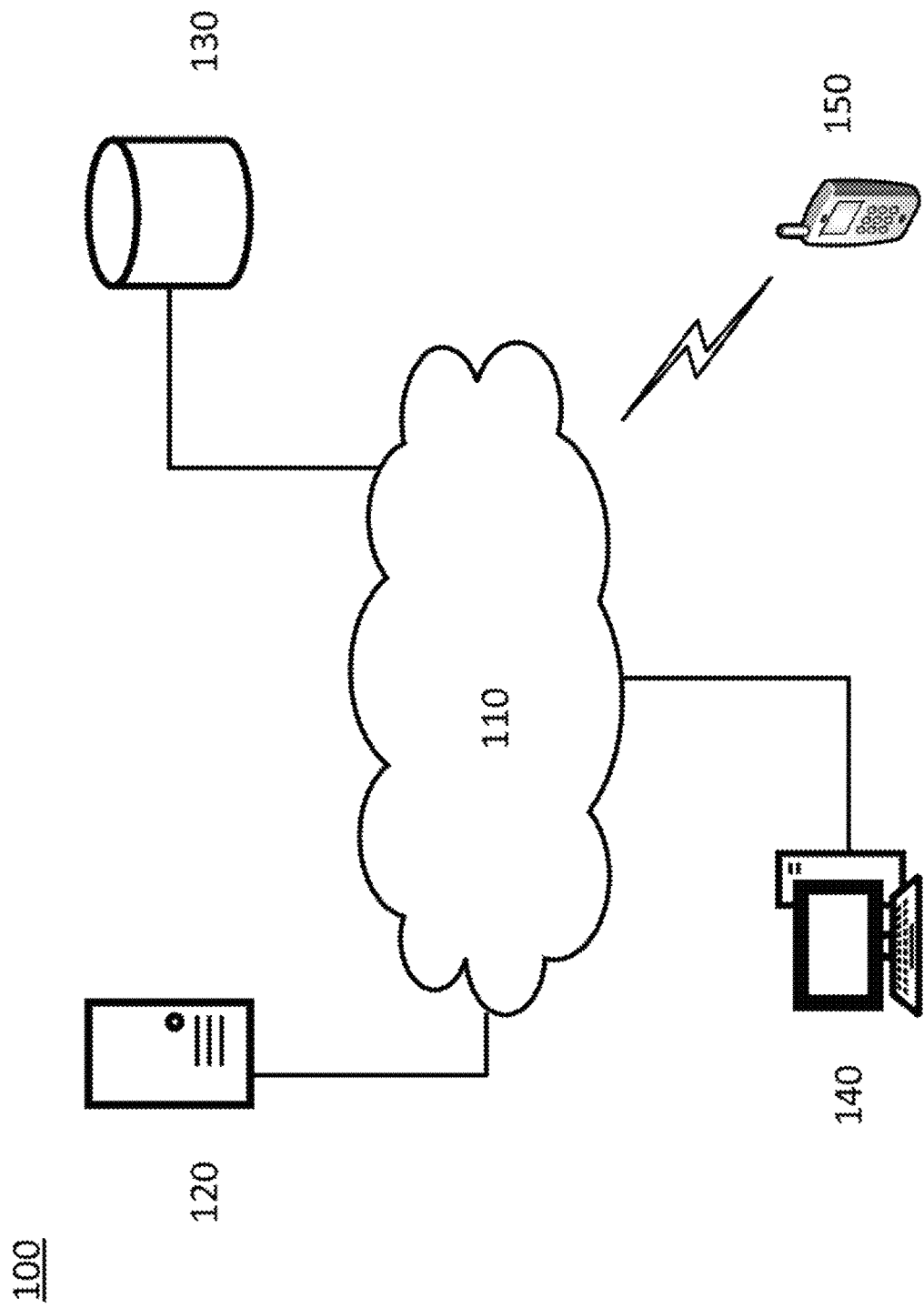
FIG. 1 illustrates a stock price forecast assist system according to an embodiment of the present technology.

FIG. 1 illustrates a stock price forecasting assist system 100 according to an embodiment of the present technology.

The stock price forecast assist system 100 includes a server 120, a database 130, and clients 140 and 150, connected to a network 110.

The network 110 communicatively connects a plurality of devices, such as a server 120, a database 130, and clients 140 and 150. The networks 110 may be, for example, the Internet, the Local Area Network (LAN), or the Wide Area Network (WAN). In addition, the network 110 may be configured by wire or wireless, or a combination thereof.

The server 120 is a computer having a processor (not shown), a memory (not shown) storing a program, and a communication function (not shown). The server 120 retrieves data from and writes data to the database 130 via the network 110. The server 120 executes a program stored in the memory in response to a request from the client 140 or 150, and returns an execution result to the client 140 or 150.

The database 130 is a storage device accessible from the server 120 via the network 110. The database 130 may be configured by database software or the like on a memory in the server 120, instead of being a separate storage device. Database 130 stores past performances and stock prices of the company. Database 130 may store the company's current stock price. The current stock price may be received in real time from a stock exchange or the like via the network 110, or may be updated at regular time intervals.

The client 140 or 150 is a computer, a tablet terminal, a smart phone, or the like having a function of communicating with the server 120 via the Internet. Although two clients 140 or 150 are depicted in FIG. 1, there may be only one or a plurality of clients 140 or 150.

Figure 2:
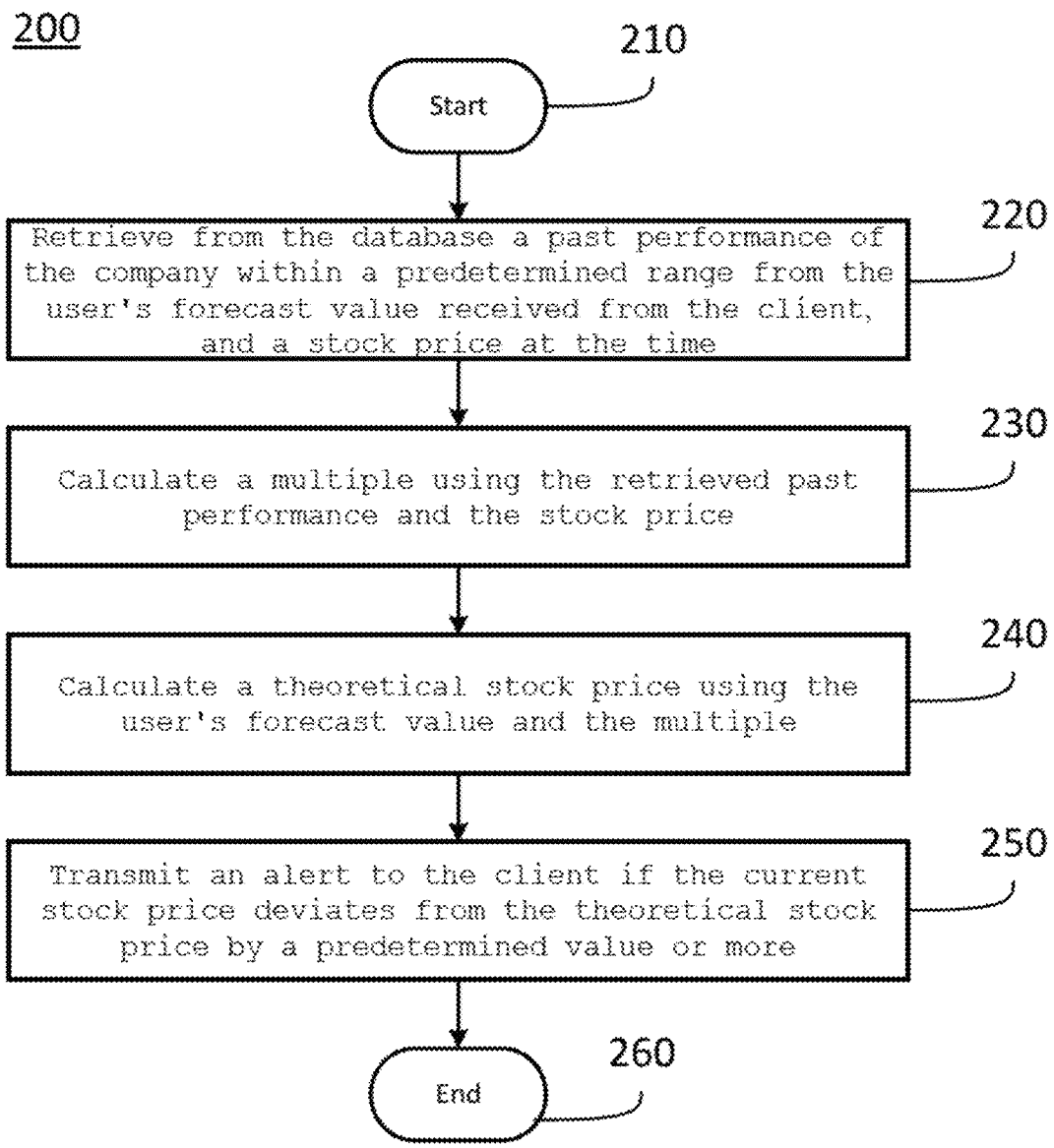
FIG. 2 is a flow chart showing a stock price forecasting assist method according to an embodiment of the present technology.

FIG. 2 illustrates a stock price forecasting assist method 200 according to an embodiment of the present technology.

In FIG. 2, in step 210, the stock price forecasting assist method 200 starts at the server 120. Next, in step 220, the server 120 retrieves from the database 130 the past performance of the company and the stock price at the time, which are within a predetermined range from the forecast value of the user received from the client 140 or 150. User forecasts for company performance are input by the user to the client 140 or 150 and transmitted from the client 140 or 150 to the server 120 via the network 110.

User forecasts for company performance include, for example, forecasts for company continuing profits. Forecasts for a company's continuing profits include forecasts for at least one indicators such as its sales, operating profit, earnings before tax, net profit, earnings per share, EBIT (Earnings Before Interest and Taxes, EBITDA (Earnings Before Interest, Taxes, Depreciation, and Amortization), its dividends or the like. The server 120 may calculate a forecast value of one of the forecasts or other indices from a plurality of forecast values of the sales, operating profit, earnings before tax, net profit, and profit per share of the company by a weighted average method or the like. The forecast value for the continuing profit of a company may be an index designated in advance by the company or the industry to which the company belongs.

The server 120 retrieves the past performance of the company and the stock price at the time, which are within a predetermined range from the user's forecast value, from the database 130. The predetermined range may be one or two times the standard deviation, may be a predetermined percentage (e.g., 10% or 15%) of the average value, may be set to any value by the user, or may be a combination thereof. The past performance of the company and the stock price at the time may be the performance in at least one accounting period and the stock price in the accounting period. The stock price in the accounting period may be any of the average stock price, the highest price, and the lowest price in the accounting period, or any of the average stock price, the highest price, and the lowest price in the accounting period from 0 to 12 months before the accounting period, or any of the stock prices in the performance announcement date and the plan revision announcement date. In this specification, the "stock price" may be a price per issued share, and may include a corporate value (Enterprise Value) and a market capitalization (Market Cap).

If the past performances of the company and the stock prices at the time, which are within a predetermined range from the user's forecast value, include the performances in at least two accounting periods and the stock prices in the accounting periods, the performance and stock price in the accounting period having a closer profit growth rate and the profit margin in the previous year may be retrieved.

Next, in step 230, the server 120 calculates a multiple using the retrieved past performance and stock price. The multiple may be a multiplication factor obtained by comparing the performance (financial index) of the company and the stock price (enterprise value, market capitalization), and may be, for example, PER (Price Earnings Ratio), PBR (Price-Book value Ratio), EV/EBITDA (Enterprise Value/EBITDA), EV/EBIT, EV/OP (EV/Operating Profit), PSR (Price Sale Ratio), PEG (PER/Growth rate), dividend yield, or the like. At this time, it is possible to calculate which multiple has the highest correlation coefficient with the stock price based on the past performance of the company and the stock price data, and to recommend which multiple should be emphasized for the company by the server.

Next, in step 240, the server 120 calculates a theoretical stock price using the user's forecast and multiple. The theoretical stock price (Enterprise Value, market capitalization) is calculated, for example, by multiplying the forecast value of the user by the multiple.

Next, in step 250, if the current stock price and the theoretical stock price deviate by more than a predetermined value, an alert is transmitted to the client. The predetermined value may be a measure of the deviations in volatility of the stock price, may be a fixed amount (e.g., 100 yen or 150 yen) or rate (e.g., 10% or 15%), may be set to any value by the user, or a combination thereof.

The alert indicates that there is more than a certain deviation between the theoretical stock price calculated from the user's own forecast and the current stock price with respect to the company's performance forecast, so that the user can expect the company's stock price to move significantly if the user's own forecast is met, which is a surprise for the market forecast. The alert may be displayed as, for example, a "securities to watch" or a "securities recommended for buy/sell (trade)".

Next, in step 260, the stock price forecast assist method 200 ends.

Figure 3:
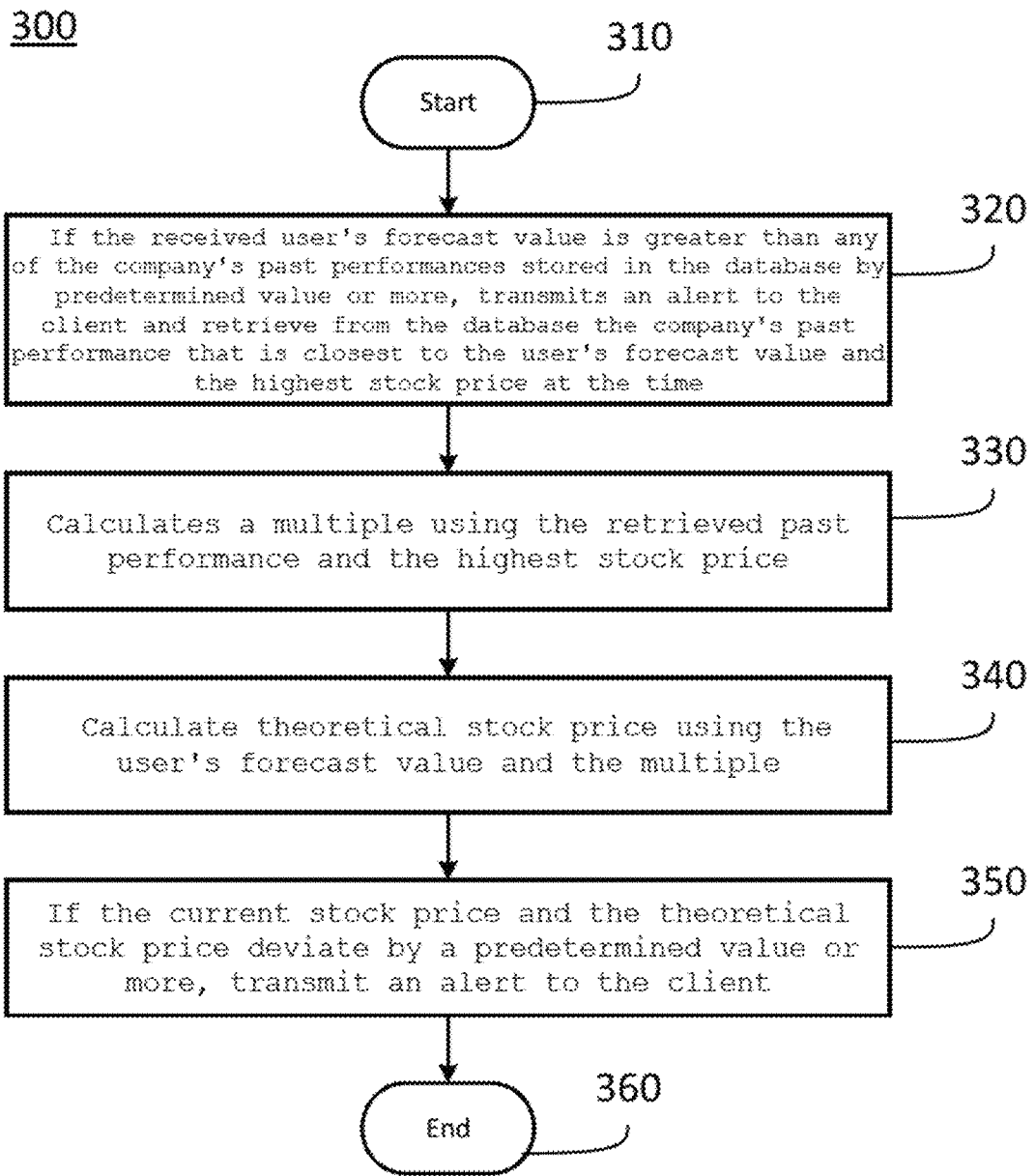
FIG. 3 is a flow chart showing a stock price forecast assist method according to another embodiment of the present technology.

FIG. 3 illustrates a stock price forecasting assist method 300 according to another embodiment of the present technology.

In FIG. 3, in step 310, the stock price forecasting assist method 300 starts at the server 120. Next, in step 320, if the received user's forecast value is greater than any of the company's past performances stored in the database 130 by predetermined value or more, the server 120 transmits an alert to the client and retrieve from the database 130 the company's past performance that is closest to the user's forecast value and the highest stock price at the time. The alert may indicate that the user's forecast value is the highest-ever forecast value.

Next, in step 330, the server 120 calculates a multiple using the retrieved past performance and the highest stock price.

Next, in step 340, the theoretical stock price is calculated using the user's forecast value and the multiple in the same manner as in step 240 (FIG. 2).

Next, in step 350, similarly to step 250 (FIG. 2), if the current stock price and the theoretical stock price deviate by a predetermined value or more, an alert is transmitted to the client.

Next, in step 360, the stock price forecast assist method 300 ends.

Figure 4:
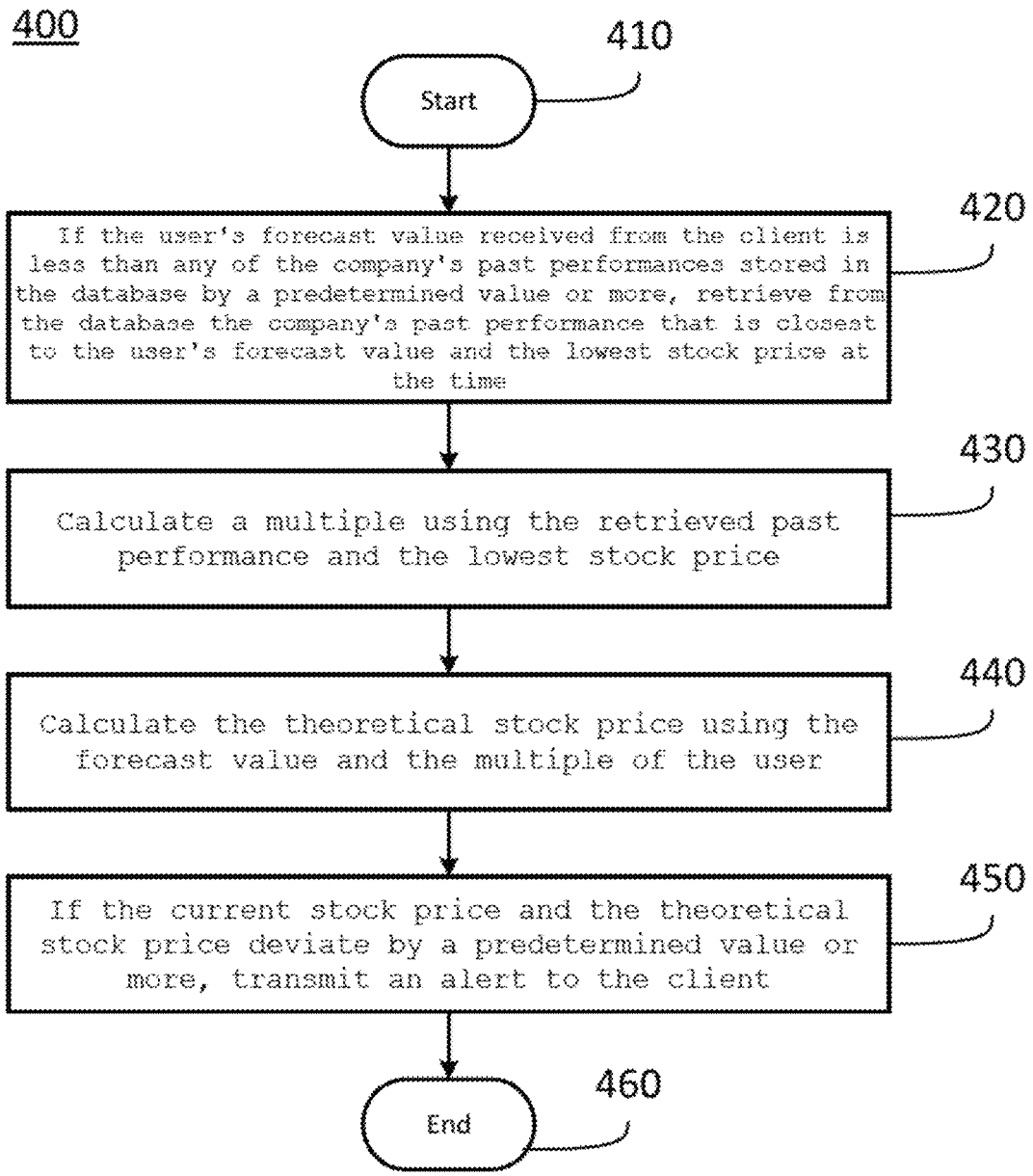
FIG. 4 is a flow chart showing a stock price forecast assist method according to still another embodiment of the present technology.

FIG. 4 illustrates a stock price forecasting assist method 400 according to another embodiment of the present technique.

In FIG. 4, at step 410, the stock price forecasting assist method 400 starts at the server 120. Next, at step 420, if the user's forecast value received from the client is less than any of the company's past performances stored in the database 130 by a predetermined value or more, the server 120 retrieves from the database 130 the company's past performance that is closest to the user's forecast value and the lowest stock price at the time.

In step 420, if the user's forecast value received from the client is indicative of a loss, thereby forecasting that the company will be in excess of debt or impaired equity, the server 120 may retrieve from the database 130 the company that has been in excess of debt or impaired equity in the company or a similar company to the company, and the period when.

Next, in step 430, the server 120 calculates a multiple using the retrieved past performance and the lowest stock price.

Next, in step 440, the theoretical stock price is calculated using the forecast value and the multiple of the user in the same manner as in step 240 (FIG. 2).

Next, in step 450, similar to step 250 (FIG. 2), if the current stock price and the theoretical stock price deviate by a predetermined value or more, an alert is transmitted to the client.

Next, in step 460, the stock price forecast assist method 400 ends.

Not limited to the embodiments described above, according to the present technology, various financial indicators of the company can be forecasted based on the user's forecast value received from the client and the company's past performance. For example, the server may transmit an alert to the client when it is forecasted that the company may violate the delisting criteria, such as a two-term consecutive debt overruns, or may be designated as a supervisory or liquidation or special attention market issue based on the user's forecast value and past business performance.

In addition, based on the forecast value of the user received from the client, the server may transmit an alert to the client in the case where it is forecasted that the company may increase capital due to the impairment of the shareholders' capital or the heavy interest burden on the debt.

In the embodiment described above, the user's forecast value of the company's performance may include a plurality of forecast values in the same accounting period, and the theoretical stock price may be calculated for each forecast value. Further, the user's forecast value regarding the company's performance may include forecast values in a plurality of accounting periods, and the theoretical stock price may be calculated for each forecast value. In addition, when calculating theoretical stock prices for forecasts over multiple accounting periods, alerts may be based on either forecast over closer accounting periods or forecasts over farther accounting periods to make recommendations in line with short or long term trading directions.

INDUSTRIAL APPLICABILITY

The present technology allows to assist the stock price forecast by referring to the past performance and stock price based on the business performance forecast of the company by the user himself/herself.

EXPLANATION OF CODES

100 Stock price forecasting assist system
110 Network
120 Server
130 Database
140, 150 Client

The invention claimed is:

1. A stock price forecast assist system comprising:
a server with a processor configured to calculate the stock price forecast using a user's forecast value formulated by the user of a company's performance so that the stock price forecast incorporates both the company's current and past performances and stock prices, and the user's forecast value;
a client configured to transmit the user's forecast value of the company's performance to the server; and
a database configured to store the company's current and past performances and stock prices, which are retrievable by the server,
wherein the server is configured to calculate the stock price forecast in response to a transmission of the user's forecast value by:
retrieving from the database a past performance of the company within a predetermined range from the user's forecast value received from the client, and a stock price at the time,
calculating a multiple using the retrieved past performance and the stock price,
calculating a theoretical stock price using the user's forecast value and the multiple, and
transmitting an alert to the client if the current stock price retrieved from the database deviates from the theoretical stock price by a predetermined value or more, wherein the alert includes at least one of a deviation value computed by the processor or a message recommending the stock of the company generated according to the deviation value.

2. The stock price forecast assist system according to claim 1, wherein the user's forecast value includes forecasts of at least one of the company's sales, operating profit, ordinary profit, earnings before tax, net profit, earnings per share, EBIT, EBITDA, or dividends.

3. The stock price forecast assist system according to claim 1, wherein the past performances of the company and the stock prices at the time include a performance in at least one accounting period and a stock price in the accounting period.

4. The stock price forecast assist system according to claim 3, wherein the stock price in the accounting period includes either the average stock price or the highest or the lowest stock price in the accounting period, or the average stock price or the highest or the lowest stock price 0 to 12 months before the accounting period, or the stock price on a performance announcement date or a revision of a plan announcement date.

5. The stock price forecast assist system according to claim 1, wherein the theoretical stock price is calculated by multiplying the user's forecast value by the multiple.

6. The stock price forecast assist system according to claim 1, wherein the predetermined value is a predetermined amount or a predetermined rate.

7. The stock price forecast assist system according to claim 6, wherein the predetermined amount or rate is calculated using any of a deviation of volatility of the stock price, a fixed amount or rate, or a value or rate set by the user.

8. The stock price forecast assist system according to claim 1, the system further configured to transmit an alert if the user's forecast value received from the client exceeds any of the company's past performances stored in the database by a predetermined value or more.

9. The stock price forecast assist system according to claim 1, wherein the server retrieves from the database the company's past performance that is closest to the user's forecast value and the highest stock price at the time, if the user's forecast value received from the client is greater than any of the company's past performances stored in the database by a predetermined value or more.

10. The stock price forecast assist system according to claim 1, wherein the server retrieves from the database the company's past performance that is closest to the user's forecast value and the lowest stock price at the time, if the user's forecast value received from the client falls below any of the company's past performances stored in the database by a predetermined value or more.

11. The stock price forecast assist system according to claim 1, wherein the server transmits an alert to the client if the user's forecast value received from the client is indicative of a loss, thereby forecasting that the company will be in excess of debt or impaired shareholders' equity.

12. The stock price forecast assist system according to claim 1, wherein the server retrieves from a database the company or similar company to the company that has been in excess of debt or impaired shareholders' equity and the period, if the user's forecast value received from the client is indicative of a loss, thereby predicting that the company will be in excess of debt or impaired shareholders' equity.

13. The stock price forecast assist system according to claim 1, wherein the server transmits an alert to the client if the company is forecasted to be likely to violate the delisting criteria based on the user's forecast value received from the client.

14. The stock price forecast assist system according to claim 1, wherein the server transmits an alert to the client if the company is forecasted to be likely to make a capital increase based on the user's forecast value received from the client.

15. The stock price forecast assist system according to claim 1, wherein the server retrieves a performance and a stock price in the accounting period in which the profit growth rate from the previous year and the profit margin are closer, if the past performance of the company and the stock price at the time include the performances in at least two accounting periods and the stock prices in the accounting period.

16. The stock price forecast assist system according to claim 1, wherein the user's forecasts of the company's performance include multiple forecasts for the same accounting period, and a theoretical stock price is calculated for each forecast.

17. The stock price forecast assist system according to claim 1, wherein the user's forecasts of the company's performance include forecasts for multiple accounting periods, and a theoretical stock price is calculated for each forecast.

18. The stock price forecasting assist system of claim 17, wherein the alert is based on either a forecast value in a closer accounting period or a forecast value in a farther accounting period.

19. A stock price forecasting assist method in a server capable of receiving a user's forecast value formulated by the user of a company's performance and capable of retrieving from a database the company's present and past performances and stock prices, comprising:
calculating the stock price forecast using a user's forecast value of a company's performance so that the stock price forecast incorporates both the company's current and past performances and stock prices and the user's forecast value, wherein
calculating the stock price forecast in response to a transmission of the user's forecast value, comprises:
retrieving a past performance of the company which is within a predetermined range from the received user forecast value, and a stock price at the time,
calculating a multiple using the retrieved past performance and the stock price,
calculating a theoretical stock price using the user's forecast value and the multiple, and
transmitting an alert to the client if the present stock price retrieved from the database deviates from the theoretical stock price by a predetermined value or more, wherein the alert includes at least one of a deviation value computed by the processor or a message recommending the tock of the company generated according to the deviation value.

20. A computer readable recording medium comprising a program for a server capable of receiving a user's forecast value formulated by the user of the company's performance and retrieving the company's present and past performances and stock prices from a database, to execute:
calculating the stock price forecast using a user's forecast value of a company's performance so that the stock price forecast incorporates both the company's current and past performances and stock prices and the user's forecast value, wherein calculating the stock price forecast in response to a transmission of the user's forecast value, comprises:
retrieving a past performance of the company which is within a predetermined range from the received user forecast value, and a stock price at the time,
calculating a multiple using the retrieved past performance and the stock price,
calculating a theoretical stock price using the user's forecast value and the multiple, and
transmitting an alert to the client if the present stock price retrieved from the database deviates from the theoretical stock price by a predetermined value or more, wherein the alert includes at least one of a deviation value computed by the processor or a message recommending the tock of the company generated according to the deviation value.

* * * * *